Sept. 19, 1967  W. C. KLEINFELDER ET AL  3,342,929
SPLICE CLOSURES
Filed July 6, 1965
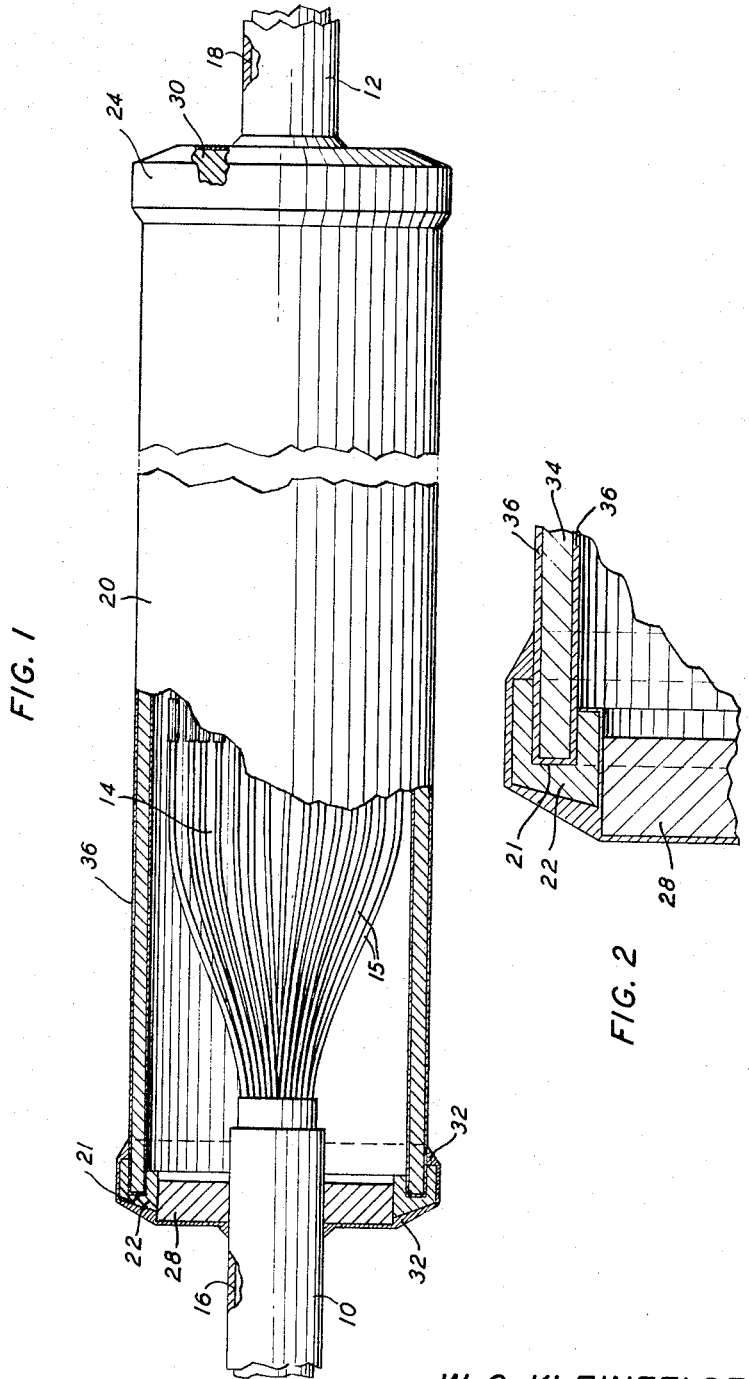
INVENTORS W. C. KLEINFELDER
E. L. RAMSEY, JR.
BY
Leo Stanger
ATTORNEY

United States Patent Office 3,342,929
Patented Sept. 19, 1967

3,342,929
SPLICE CLOSURES
Walter C. Kleinfelder, Summit, and Edward L. Ramsey, Jr., Martinsville, N.J., assignors to Bell Telephone Laboratories, Incorporated, New York, N.Y., a corporation of New York
Filed July 6, 1965, Ser. No. 469,581
4 Claims. (Cl. 174—88)

ABSTRACT OF THE DISCLOSURE

A blast-resistant splice case for cables is formed from a sleeve of solder-dipped steel surrounding a splice bundle and two end plates embracing the jackets of the cable. The end plates extend radially from the cable jackets but not quite far enough outwardly to reach the sleeve ends. The space between the end plates and the sleeve permits the sleeve to slide over the end plates. Joining the end plates and the sleeve are two rings that embrace both the end plates and hold the edges of the sleeves in annular grooves. The splice case members are joined together by solder wiping.

---

This invention relates to splice closures, particularly for protecting splices that join lengths of underground multicoaxial communication cables.

For such cables a lead jacket provides a somewhat flexible barrier to the ingress of water or water vapor. At the same time, it furnishes a hermetic obstruction to egress of pressurized gas to which the cable is subjected for further protection from entrance of water or vapor. To retain the vapor barrier throughout the cable, splices joining these cable lengths are also jacketed in closures having lead sleeves capable of withstanding internal gas pressures. Such sleeves must be larger than the cable jackets because every cable joint actually constitutes a bundle of individual splices.

Large-diameter cables such as those having twenty coaxials require splice closures whose lead sleeves may become so heavy as to constitute a safety hazard during installation of the closure. Such installation is done manually and frequently takes place in slippery terrain inaccessible to trucks or other heavy machinery. A workman standing in a muddy pit may have to receive a 140-pound sleeve from a helper on grade. To complete the closure after sliding the sleeve over the splice bundle, it is necessary to "beat in" the ends of the sleeve until it firmly embraces end plates extending radially from the lead cable jackets. This beating in is a laborious process.

Aside from their undesirable weight, lead sleeve closures are inadequate in that, to withstand pressures from nearby explosions, they must include supplementary steel liners. Also to repair a splice, the beaten in portion must be pried up before the sleeve can be removed. This creates the danger of slitting the sleeve with the prying tool.

Attempts to overcome these deficiencies by replacing the central portion of the lead sleeve with a steel cylinder have been partly successful. However, a good deal of heavy lead sleeving remains. The problems of beating in and opening the splice closure also remain.

An object of this invention is to avoid the above difficulties.

Another object is to improve splice closures, particularly by decreasing their weight so as to render them easy and safe to handle.

Another object of the invention is to make them lighter while retaining their vapor barrier properties and without subjecting them to rupture due to nearby blasts.

Still another object of the invention is to eliminate substantially the need for "beating in" the ends of a sleeve on a splice closure when closing the splice.

According to the invention these objects are obtained in whole or in part by sliding a steel sleeve previously dip coated with solder, over a cable splice until the sleeve ends cover two lead end plates projecting radially from the jackets of the cable to be joined, and then fitting the sleeve to the jacket with respective lead rings that simultaneously embrace the end plates and firmly grasp the sleeve ends in annular grooves. The sleeve ends and rings are solder connected to each other by the so-called "solder wiping" technique.

These and other features of the invention are pointed out in the claims forming a part of this specification. Other objects and advantages of the invention will become obvious from the following detailed description when read in light of the accompanying drawing wherein:

FIG. 1 is a partly cross sectional view illustrating a splice embodying features of the invention; and FIG. 2 is a cross-sectional detail of a portion of the closure in FIG. 1.

In FIG. 1 two lengths 10 and 12 of cable, each carrying twenty coaxials therein, terminate in a splice bundle 14 that electrically joins the individual coaxials 15 of one length to the other. Surrounding the lengths 10 and 12 are respective lead jackets 16 and 18. These constitute a barrier to influx of vapor or water and to the efflux of gases pressurizing the cable. Similarly surrounding the splice bundle 14 is sleeve 20 of steel dip coated with solder whose ends fit into annular recesses 21 of two solder-coated lead rings 22 and 24. Only the recess 21 on the ring 22 is shown. The recess on ring 24 is identical but faces in the other direction. The inner surfaces of the rings 22 and 24 embrace the peripheries of two respective washer-shaped end plates 28 and 30 made of lead and projecting radially from the jackets 16 and 18.

Solder joints 32 hermetically seal the surfaces between the jackets 16 and 18 and the plates 28, between the plates 28 and 30 and the rings 22 and 24, and between the rings 22 and 24 and the sleeve 20.

FIG. 2 is a sectional detail of the sleeve 20 showing an end of the sleeve fitting into the recess 26. In the sleeve 20, a steel cylinder 34 supports a layer of solder 36.

The splice in FIG. 1 is constructed by first cleaning the cylinder 34 in a shop and dipping it in a hot solder bath approximately fifty percent lead-fifty percent tin. In the field before forming the splice bundle 14 a workman slides the plates 28 and 30 and the solder-coated rings 22 and 24 over the respective lead jackets 16 and 18. The annular recesses in the rings 22 and 24 must face each other. He then slips the sleeve 20 over one of the lentghs 10 or 12 and forms the splice bundle 14. He tack solders the end plates 28 and 30 onto the jackets 16 and 18 at points separated from each other by a distance equal to the length of sleeve 20 and slides the sleeve over the end plates. He then fits the rings 22 and 24 around the end plates 28 and 30 and simultaneously embraces the ends of sleeve 20 with the annular recesses of the ring.

The closure in completed by solder-wiping one end of the sleeve at a time. This involves forming the solder joints 32 by repeatedly flowing molten solder over the end of the sleeve 20, the ring 22, the end plate 28, and the jacket 16 and wiping off the excess until these members become hot enough so that the applied solder flows into all interstices. The solder is then wiped again to leave the joints 32. A low-melting bismuth-solder stick is then wiped over the still hot members to fill the smallest cracks. The workman completes the splice closure by repeating the procedure on the other end.

In solder wiping the closure, the solder coatings on the rings 22 and 24 and the sleeve 20 serve to assure wetting and bonding between large surfaces of the rings 22 and 24 and the sleeve 30.

The splice closure of FIG. 1 is lighter than lead splice closures by a factor of almost two to one and nevertheless affords the same vapor and water barrier hitherto expected only of lead closures. It furthermore provides explosion and blast protection unavailable from purely lead closures. It is also far less expensive.

The rings 22 and 24 are particularly significant in this structure. They not only permit the sleeve to slide over the end plates during assembly of the closure, but at the same time substantially obviate the need for shaping the ends of lead sleeves. Simultaneously they alleviate the tendency, during cooling, of the steel cylinder to pull radially from contact with the rings due to lesser contraction of steel cylinder 34 than the lead end plates, by embracing both inner and outer surfaces of the sleeve 20.

The rings 22 and 24 are also significant when maintenance must be performed on the splice bundle 14. When properly heated, striking the rings axially knocks them off the sleeve 20 and the end plates, thereby permitting simple access to the closure interior. In the past the beaten-in sleeves had to be pried up. This resulted in the danger of accidentally tearing the sleeve with the prying tool. The ring after removal of the closure for maintenance may either be reused or replaced by a new split ring. When reapplied about the end plates and sleeve, the ring fits easily when heated but squeezes down on the solder-coated steel sleeve during the cooling process.

A typical sleeve for a 20-coaxial splice bundle is made from type 1010 or 1020 cold-rolled steel 40 inches long, with a 7-inch (+0, −1/16) outside diameter and a welded seam. It receives a hot-dip coating of fifty percent tin-fifty percent lead solder. The rings 22 and 24 have a 6.1-inch inner diameter, a 7.63-inch outer diameter, and a 0.25-inch annular recess. The plates have a 6.1-inch outside diameter.

While an embodiment of the invention has been described in detail, it will be obvious to those skilled in the art that the invention may be embodied otherwise within its spirit and scope.

What is claimed is:

1. A splice case for enclosing a splice that joins co-axial conductors of two lengths of lead-jacketed cable, comprising sleeve means for surrounding the splice and including a steel cylinder having a lead alloy layer bonded to its inner and outer surfaces, two disk-shaped end plates each having a center hole for embracing the jacket on one of said cable lengths, said end plates having a substantial lead composition and extending radially from the holes to an outer diameter smaller than the inner diameter of said sleeve means, two rings of lead composition each having an inner opening and having respective annular recesses receiving therein the respective ends of said sleeve means, said rings embracing the outer surfaces of said end plates at said inner openings, and solder joining said rings to said sleeve and said end plates in hermetically tight joints, the holes in said end plates being of such size that when they embrace the jackets on the cable lengths the end plates are capable of being soldered to the jackets on the cable lengths and such that the solder used can form with said end plates and the jackets hermetically tight seams.

2. A cable splice comprising, two cable sections each having a plurality of coaxials mounted therein and having jackets made substantially of lead, a plurality of coaxial splices joining respective coaxials in the cables to each other and forming a splice bundle, a sleeve surrounding said splice bundle and including a steel cylinder having a lead-alloy layer substantially thinner than said cylinder and bonded to its outer and inner surfaces, two disk-shaped end plates each having a center hole and embracing the jackets on respective ones of said cable sections, said end plates having a lead composition and extending radially from said jackets to diameters smaller than the inner diameters of said sleeve means, two rings of lead composition each having an inner opening and having annular recesses that receive the sleeve at respective ends, said rings embracing the outer surfaces of said end plates at said inner openings, and solder joining said rings to said sleeve and said end plates and joining said end plates to said jacket in hermetically tight seals.

3. A splice case for enclosing a splice that joins coaxial conductors of two lengths of lead-jacketed cable, comprising sleeve means for surrounding the splice and including a steel cylinder having a lead alloy layer bonded to its inner and outer surfaces, a disc-shaped end plate having a center hole for embracing the jacket on one of said cable lengths, said end plate having a substantially lead composition and extending radially from said hole to an outer diameter smaller than the inner diameter of said sleeve means, a ring of lead composition having an inner opening and having an annular recess receiving therein one end of said sleeve means, said ring embracing the outer surface of said end plate at said inner opening, solder joining said ring to said sleeve and said end plate in an hermetically tight joint, the hole in said end plate having a diameter such that when the center hole of the end plate embraces the jacket on the one of said cable lengths, said end plate can be soldered to the jacket and the solder used for soldering can form an hermetically tight seam, and means on the other end of said sleeve means for forming an hermetic seal with said sleeve means and capable of being hermetically sealed to the jacket on the other one of said cable lengths.

4. A cable splice comprising two cable sections each having a plurality of coaxials mounted therein and having jackets made substantially of lead, a plurality of coaxial splices joining respective coaxials in the cables to each other and forming a splice bundle, a sleeve surrounding said splice bundle and including a steel cylinder having a lead alloy layer substantially thinner than said cylinder and bonded to its outer and inner surfaces, a disc-shaped end plate having a center hole and embracing the jacket on one of said cable sections, said end plate having a lead composition and extending radially from said jacket to a diameter smaller than the inner diameter of said sleeve means, a ring of lead composition having an inner opening and having annular recesses that receive one end of said sleeve, said ring embracing the outer surface of said end plate at said inner opening, solder joining said ring to said sleeve and said end plate and joining said end plate to said jacket in hermetically tight seals, and means at the other end of said sleeve for joining said sleeve to said jacket on said other cable section in hermetically tight seals.

No references cited.

DARRELL L. CLAY, *Primary Examiner.*